Figure 2:
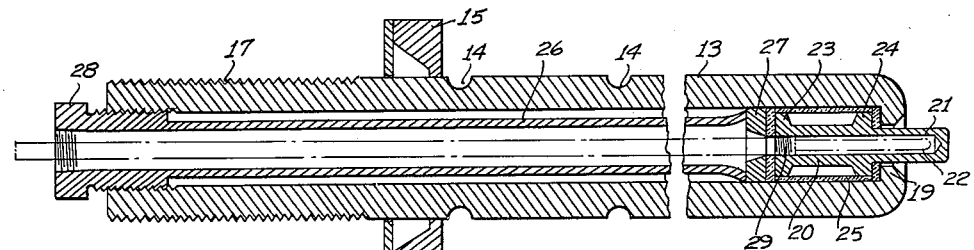

March 7, 1944.  H. H. RICHMOND  2,343,242

MOUNTING FOR THERMOSENSITIVE ELEMENTS

Filed Oct. 9, 1941

HARRY H. RICHMOND
INVENTOR.

BY Harold L. Cook
ATTORNEY

UNITED STATES PATENT OFFICE 2,343,242

MOUNTING FOR THERMOSENSITIVE ELEMENTS

Harry H. Richmond, Portland, Oreg., assignor to Electric Steel Foundry Company, Portland, Oreg., a corporation of Oregon Application October 9, 1941, Serial No. 414,329

7 Claims. (Cl. 136—4)

The present invention relates to mountings for thermo-sensitive elements, and has particular reference to mountings for thermocouples and like temperature responsive devices in the walls of thermo-processing chambers.

In various industrial processes material is processed within enclosures at controlled temperatures. Temperature indicating means are usually provided which include relatively delicate thermocouples, or thermometer bulbs mounted in the walls of the processing chamber, and which extend in a thermal conductive relation with the material being processesd. These devices are suitably connected to indicator mechanisms which may be arranged at a remote point. The processing chamber may be an oven, a cooking vessel, a digester, or a similar chamber; and frequently it is important that temperature changes in other types of enclosures, such as heat exchangers or pipes, be recorded. In certain types of chambers material being processed is subject to shifting movements during the processing perriod, which movements tend to exert severe stresses upon the thermo-sensitive element extending into the material. To prevent injury to the thermo-sensitive element, special mountings must be provided therefor to take up the mechanical shock of the shift of surrounding material. In other types of installations the temperature responsive devices must be made strong enough to withstand severe stresses imposed by pressure differentials. Frequently such mountings have a considerable mass, and hence considerable heat storage capacity, so that the temperature indication is not accurate for the material but is influenced by the temperature of the mounting, which usually does not follow closely the changes in the temperature of the material.

From the standpoint of accuracy of temperature indication, therefore, it is desirable that the thermally sensitive element be so mounted as not to be appreciably influenced by the temperature of the mounting. Since the element must be more or less exposed and hence subject to deterioration, it is further desirable that provision be made in the mounting whereby the fragile parts may be removed for inspection and repair or replacement, if required, without necessitating a complete shutdown of the installation.

It is a general object of the invention, therefore, to provide a new and improved arrangement for mounting a thermo-sensitive element in a wall of a processing chamber, which arrangement is substantially indestructible as regards shifting movement of the material being processed, or stresses imposed by pressure differentials, and which permits the thermo-sensitive element to respond accurately to the temperature of the material.

It is a further object of the invention to provide a new and improved mounting arrangement for a thermo-sensitive element, which arrangement is relatively rugged in design and which may readily be dismantled from the exterior of the enclosure.

It is a further object of the invention to provide a new and improved mounting for a thermosensitive element which is so constructed and arranged that inspection of the element may be made from either the exterior or the interior of the processing chamber.

In accordance with one form of the invention, the mounting comprises a relatively indestructible, or heavy walled, tubular housing having at the inner end an inwardly extending flange defining an aperture. A relatively small, thin walled receptacle is arranged within the inner end of the housing in a substantially non-heat conductive relation therewith, and has a closed end portion extending through the aperture for cooperatively receiving a thermo-sensitive element in a projecting relation from the end of the housing. The receptacle is clamped in the inner end of the housing by means removably attached to the housing, whereby the thermo-sensitive element and the receptacle may readily be withdrawn from the housing for inspection and repair or replacement.

For a consideration of what is believed novel and invention, attention is directed to the following description taken in connection with the accompanying drawing, while the features of novelty which characterize the invention will be pointed out with greater particularity in the appended claims.

Figure 7:
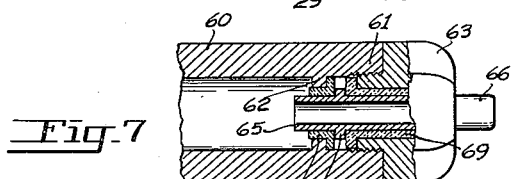
Figure 4:
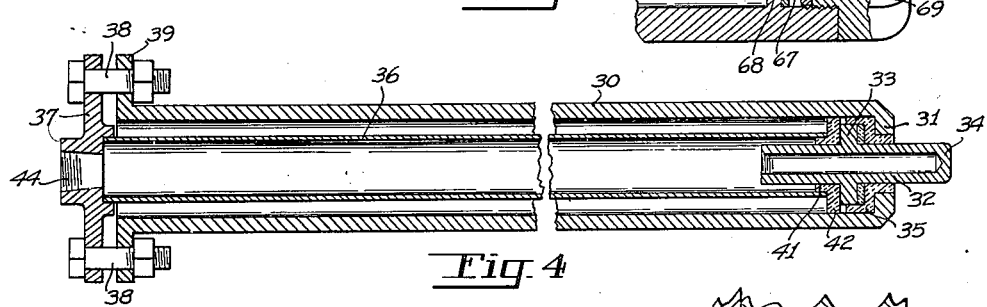
Figure 1:
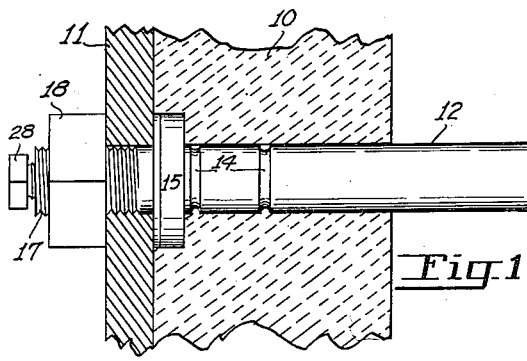
Figure 3:
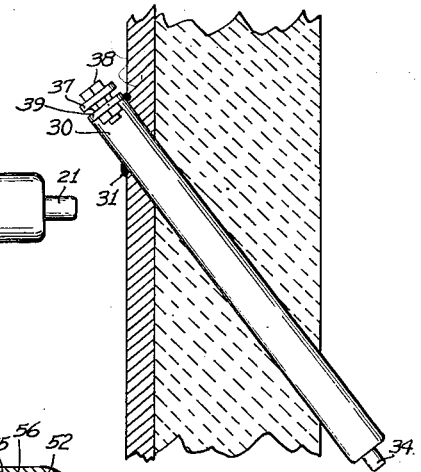
Figure 5:
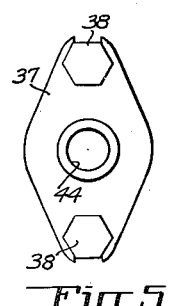
Figure 6:
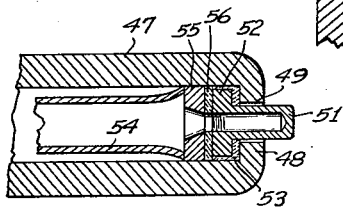

In the drawing: Figure 1 is a sectional view of a portion of a wall of a process chamber having arranged therein a mounting for a thermo-sensitive element constructed in accordance with one embodiment of the invention; Figure 2 is a longitudinal sectional view illustrating in greater detail the construction of the mounting shown in Figure 1; Figure 3 is a sectional view of a portion of a wall of a process chamber showing a modification of a mounting for a thermo-sensitive element; Figure 4 is a longitudinal sectional view illustrating the construction of the modification shown in Fig. 3; Figure 5 is an end view of the mounting of Figure 4; and Figures 6 and 7 are fragmentary sectional views illustrating alternative means for clamping the receptacle in the inner end of the housing.

Processing chambers may comprise relatively heavy walls consisting of a thick refractory liner and an outer steel shell. Such is the construction, for example, of digesters for processing wood pulp. A portion of such a wall is shown in Figure 1 made up of a liner 10 and a shell 11 in which is arranged a mounting 12 for a thermo-sensitive element constructed in accordance with the present invention and which is shown in section in Figure 2.

The mounting 12 comprises a relatively heavy or thick walled elongated metal tube or housing 13 which is adapted to extend through a cooperating opening in the wall of the chamber. The tubular housing 13 is provided with a plurality of annular grooves 14 which may be filled with cement to effectively seal the space between the housing and the liner of the chamber. An annular collar 15 is securely fastened to the housing, and is spaced from the threaded end portion 17 sufficiently to permit the end portion to extend through the steel shell 11. A nut 18 arranged on the threaded end 17 of the housing clamps the shell firmly between the nut and the collar 15. The housing 13 is of such length as to extend a considerable distance into the interior of the chamber and into contact with the material contained therein. The inner end of the tubular housing 13 is provided with an inwardly extending flange portion 19 defining an aperture of somewhat smaller diameter than the interior of the housing proper. Arranged within the inner end of the housing and secured against the flange 19 is a tubular receptacle 20 having a relatively thin walled closed end portion 21 extending outwardly through the end aperture of the housing 13 and having annular flanges 23 and 24 of a diameter greater than that of the aperture. A member 25 of relatively poor heat conductivity is arranged between the housing 13 and the receptacle 20 so as to avoid a direct thermo-conductive path therebetween. The member 25 may be of any suitable material such as a Bakelite or asbestos and may consist of a central tubular portion and end washers. The receptacle 20 is adapted cooperatively to receive a thermo-sensitive element indicated by dotted lines 22 which may be inserted therein from the outer end of the housing 13 and held within the closed end portion 21 of the receptacle beyond the end of the housing 13.

The receptacle 20 may be retained within the end of the housing 13 by means including a tubular member 26 extending into the housing from the outer end thereof and bearing against the end of the receptacle 20 through the metal washer 27 and end portion or washer of the insulating member 25. The diameter of the tube 26 is somewhat smaller than the inner diameter of the housing 13 so as to form a dead air pocket therebetween, the innermost end of the tube being flared outwardly so that the tube will be held in a substantially centered position as it is moved into the receptacle clamping position. The outer end of the tubular member 26 is secured to the end of a sleeve nut 28 which in turn is threaded into the outer end of the housing 13 for exerting a clamping pressure upon the receptacle 20 so as to hold it firmly against the housing flange 19.

A thermo-sensitive element 22 is arranged within the receptacle 20 and extends beyond the end of the housing 13 so that it will respond accurately to the temperature of the material contained within the chamber. The receptacle 20, being insulated from the enclosing housing 13, will be substantially unaffected by the temperature of the latter. Since the end 21 of the receptacle 20 for the thermo-sensitive device extends but a short distance, such as a fraction of an inch, beyond the end of the housing 13, it presents a relatively short lever arm for forces acting thereagainst arising from movements of material within the chamber. It may be necessary to remove the receptacle 20 from time to time, either to inspect the condition thereof or to replace it with a new one, which operation may be performed from the exterior of the chamber merely by removing the nut 28 and withdrawing the clamping tube 26. A threaded rod may then be screwed into the end of the receptacle as at 29 by which means it may be pulled out. Since the housing 13 is so proportioned as to be substantially indestructible as regards forces likely to be imposed thereupon by material being treated within the chamber, only the small receptacle tip is subject to deterioration and may readily be replaced from the exterior of the process chamber.

The modification of the mounting illustrated in Figures 3 and 4 comprises a relatively heavy tubular housing 30 which is adapted to extend through a cooperating opening in a wall of a chamber and which, instead of being clamped to the shell as in the previous modification, may be welded thereto by external welds as indicated at 31. This manner of fastening the mounting in place may be preferred when it is desired to arrange the mounting at an angle relative to the chamber wall so that the inner end projects downwardly within the chamber. In the event that the material being processed is relatively heavy and is loaded into the chamber from the top, or the material is subject to rather sudden downward settling movements in heavy masses, the angular arrangement of the mounting offers less resistance thereto, and injury to the receptacle tip is least likely to occur. As in the previously described modification, the inner end of the mounting housing 30 is provided with an inwardly extending flange portion 31 forming a shoulder within the housing against which the receptacle 32 is clamped. The receptacle 32 for cooperatively receiving a thermo-sensitive element comprises a tubular member having an annular flange 33 and a closed end portion 34 extending outwardly from the tubular housing 30. The receptacle is insulated from the housing by a member 35 of poor heat conductivity arranged between the element receptacle 32 and the housing 30 so as to prevent a direct heat conductive path therebetween. The receptacle 32 is adapted to be clamped in the inner end of the housing 30 by means of a tubular member 36 which is inserted into the housing 30 through the outer end and which in turn is clamped in position by means of a flanged clamping collar 37 and bolts 38 engaging also the flange 39 extending outwardly from the outer end of the housing 30. The inner end of the tube 36 is supported upon the sleeve portion 41 of a washer 42 of poor heat conductive material which is arranged between the tube and the receptacle flange 33. By tightening the bolts 38 the tubular member 36 is put under compression to clamp the receptacle firmly in the inner end of the housing 30. The clamping collar 37 is provided with an axial opening 44 through which a suitable temperature responsive element may be inserted into the pocket of the receptacle 32. The open end of the receptacle 32 is threaded for receiving the threaded end of a pullout rod if it is desired to withdraw the receptacle from the housing.

In Figure 6 is illustrated a further modification of the invention. The inner end of the housing 47 is provided with an inwardly extending flange 48 defining a circular end aperture 49. A thermo-sensitive element receptacle comprising a relatively short closed end tubular portion 51 and a flange portion 52 is arranged within the housing, the closed end portion 51 projecting in a spaced relation through the aperture 49. The flange portion is separated from the housing 47 by a member 53 of poor heat conductivity and is adapted to be secured relatively to the housing by a flared end clamping tube 54 acting thereagainst through the metal washer 55 and the washer 56 of heat insulating material.

In Figure 7 is illustrated an alternative means for clamping the receptacle for the thermo-sensitive element within the protective housing. As illustrated, the structure comprises a tubular housing 60 having an internally threaded end portion 61 and being provided with an inturned flange 62 adjacent its inner end defining a central aperture. An end portion 63 threadedly engages the housing 60, the surface thereof being made in the form of a hexagon for convenience in applying a wrench. The end portion 63 of the housing is provided with a central aperture of approximately the same diameter as the aperture defined by the inturned flange 62 in the housing 60.

Arranged within the inner end of the housing 60 is a tubular receptacle 65 having a relatively thin walled closed end portion 66 extending outwardly through the aperture in the end portion 63 of the housing, and being provided with an annular flange 67 of slightly less diameter than the diameter of the aperture. A flanged sleeve 68 of relatively poor heat conductivity is arranged between the inturned flange 62 of the housing 60 and the annular flange 67 of the receptacle 65, and a second flanged sleeve 69 of relatively poor heat conductivity is arranged between the receptatcle 65 and the end portion 63 of the housing.

The receptacle 65 is clamped in position against the flange 62 in the housing 60 by the end portion 63 of the housing. It will be evident, therefore, that the receptacle 65 is adapted to be inserted in the housing 60 from the inner end thereof upon removal of the end portion 63. This construction is advantageous for use in large processing chambers such as pulp digesters where inspections are frequently made of the interior of the chamber. A mounting of this construction enables an inspector to remove and replace a damaged receptacle from the inner end of the housing during inspection of the inside of the chamber.

In each of the structures herein illustrated and described the insulating material arranged between the housing and the receptacle for the thermo-sensitive element is also intended to seal the interior of the housing from the processing chamber. It will be noted in Figures 2 and 6 that the apertures in the inner ends of housings 13 and 47 are of somewhat greater diameter than the diameter of the receptacle. In these structures, as well as those illustrated in Figures 4 and 7, the apertures are sealed by the insulating members.

Having now described my invention and in what manner the same may be used, what I claim as new and desire to protect by Letters Patent is:

1. A wall mounting for a thermo-sensitive element comprising a thick walled elongated tubular housing of sufficient length to extend to within a processing chamber and having an inner end and an outer end, an inturned flange defining an aperture adjacent the inner end, a relatively short tubular receptacle arranged within the inner end of said housing for receiving a thermo-sensitive element, said receptacle having a closed end portion extending through said aperture and an annular flange, a heat insulator arranged between and separating said receptacle from said housing and extending between said flanges for sealing the interior of said housing from said chamber, and means removably attached to the housing and extending into the outer end of said housing for clamping said receptacle against said inturned flange.

2. A wall mounting for a thermo-sensitive element comprising an elongated tubular housing of sufficient length to extend to within a processing chamber and having an inner end and an outer end, an inturned flange defining an aperture adjacent the inner end, a relatively short tubular receptacle arranged within the inner end of said housing for receiving a thermo-sensitive element, said receptacle having a closed end portion extending through said aperture and an annular flange, a heat insulator arranged between and separating said receptacle from said housing and extending between said flanges, and means removably attached to and extending within said housing for clamping said receptacle against said inturned flange, said last mentioned means being separated from said receptacle by said heat insulator.

3. A wall mounting for a thermo-sensitive element, comprising a tubular housing of sufficient length to extend to within a processing chamber and having an inner end and an outer end, an inturned flange defining an aperture at said inner end, a relatively short tubular receptacle arranged within the inner end of said housing and having a closed end portion extending through said aperture beyond the end of said housing a distance substantially no greater than the diameter of said housing, said tubular receptacle being adapted for receiving a thermo-sensitive element within said closed end portion whereby said element extends beyond the end of said housing, a member of relatively poor heat conductivity arranged between and separating said receptacle from said housing, and means inserted into the outer end of said housing for fastening said receptacle securely against the inner end flange of said housing.

4. A mounting for a thermo-sensitive element, comprising a tubular housing of sufficient length to extend to within a processing chamber and having an inturned flange defining an aperture at one end thereof, a tubular receptacle arranged within the inner end of said housing and having a closed end portion extending through said aperture, said receptacle being adapted for receiving a thermo-sensitive element insertable from the opposite end of said housing and for holding said element within said closed end portion beyond the inner end of said housing, an annular flange on said receptacle, a member of relatively poor heat conductivity arranged between and separating said receptacle from said housing, a tubular member extending into said housing from said opposite end, and means securing the outer end of said tubular member relative to said housing for securely clamping said receptacle in said housing, said tubular member being of smaller diameter than the inner diameter of said housing so as to provide a space therebetween for insulating said tubular member from said housing.

5. A mounting for a thermo-sensitive element, comprising a heavy walled tubular housing of sufficient length to extend to within a processing chamber and having an inner end and an outer end, an inturned flange defining an aperture at said inner end, a relatively thin walled tubular receptacle arranged within the inner end of said housing and having a closed end portion extending through said aperture a distance substantially no greater than the diameter of said housing, said receptacle being adapted for receiving and enclosing a thermo-sensitive element extending beyond the inner end of said housing, a heat insulator arranged between and separating said receptacle and said housing, and means insertable into said housing from said outer end and adapted to be removably secured to said housing at said outer end for clamping said receptacle securely against said insulator and said inturned flange.

6. A mounting for a thermo-sensitive element, comprising a relatively heavy tubular housing of sufficient length to extend to within a processing chamber and having an inner end and an outer end, a relatively light tubular receptacle removably arranged within the inner end of said housing and having a closed end portion extending a relatively short distance beyond the inner end of said housing, said receptacle being adapted for cooperatively receiving and enclosing a thermo-sensitive element extending beyond the inner end of said housing, a combined heat insulating and sealing means arranged between and separating said receptacle and said housing, and means operable from the outer end of said housing for securely fastening said receptacle in said inner end of said housing.

7. A mounting for a thermo-sensitive element, comprising a tubular housing of sufficient length to extend to within a processing chamber and having an inturned flange defining an aperture at one end thereof, a tubular receptacle arranged within the inner end of said housing and having a closed end portion extending through said aperture and a relatively short distance beyond the end of said housing, said receptacle being adapted for receiving a thermo-sensitive element insertable from the opposite end of said housing and for holding said element within said closed end portion beyond the inner end of said housing, an annular flange on said receptacle, a combination heat insulating and sealing member arranged within said housing, separating said receptacle and said housing, and means removably secured to said housing for clamping said receptacle against said insulation-sealing member and said inturned flange.

HARRY H. RICHMOND.